(12) United States Patent
Zhao et al.

(10) Patent No.: US 12,737,027 B2
(45) Date of Patent: Sep. 15, 2026

(54) ELECTRONIC DEVICE AND METHOD FOR INTERRUPT PROCESSING WITH LOW POWER CONSUMPTION

(71) Applicant: MediaTek Singapore Pte. Ltd., Singapore (SG)

(72) Inventors: Hongxu Zhao, Beijing (CN); Zhanmeng Xiao, Beijing (CN)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 122 days.

(21) Appl. No.: 18/772,637

(22) Filed: Jul. 15, 2024

(65) Prior Publication Data

US 2025/0044858 A1 Feb. 6, 2025

(30) Foreign Application Priority Data

Aug. 4, 2023 (CN) ........................ 202310978609.5
Jun. 18, 2024 (CN) ........................ 202410788353.6

(51) Int. Cl.
*G06F 1/3234* (2019.01)
*G06F 9/48* (2006.01)

(52) U.S. Cl.
CPC .......... *G06F 1/3234* (2013.01); *G06F 9/4812* (2013.01)

(58) Field of Classification Search
CPC .... G06F 1/3234; G06F 9/4812; G06F 1/3275; G06F 1/3287
See application file for complete search history.

(56) References Cited

U.S. PATENT DOCUMENTS 5,727,227 A * 3/1998 Schmidt .................. G06F 9/462 712/E9.067
5,996,058 A * 11/1999 Song ..................... G06F 9/3888 712/E9.067
8,260,996 B2 * 9/2012 Wolfe .................. G06F 9/4812 710/267
8,504,753 B2 * 8/2013 Danko .................. G06F 9/4812 710/262
9,128,703 B1 * 9/2015 Lachwani ............... G06F 1/206
10,055,369 B1 * 8/2018 Tucker .................. G06F 9/5038
10,078,604 B1 * 9/2018 Cristobal ............... G06F 13/24

(Continued)

*Primary Examiner* — Faisal M Zaman
(74) *Attorney, Agent, or Firm* — McClure, Qualey & Rodack, LLP

(57) ABSTRACT

An electronic device includes a local memory, multiple global memories, a coprocessor, an application processor, a memory protect unit and a memory access monitor. The coprocessor is electrically coupled to the local memory, the global memories, and the application processor, and runs an ultra-low power framework. The ultra-low power framework includes an interrupt align and activity group, a memory predict monitor, and a task dynamic migration monitor. The interrupt align and activity group aligns multiple interrupts, so that the coprocessor is waken up based on the aligned interrupts to perform all expired low power functions, and the application processor is aligned to wake up based on a wakeup of the coprocessor. The memory protect unit and the memory access monitor are electrically coupled to the global memories and the coprocessor, run the memory predict monitor, and determine whether to power off the global memories through the memory access monitor.

20 Claims, 11 Drawing Sheets

(56) References Cited

U.S. PATENT DOCUMENTS

2003/0046464 A1* 3/2003 Murty .................. G06F 9/4812 710/260
2005/0132096 A1* 6/2005 Raghunath ........... G06F 1/3215 710/15
2006/0031692 A1* 2/2006 Kato .................... G06F 1/3203 713/300
2009/0259863 A1* 10/2009 Williams ............. G06F 1/3203 713/323
2010/0205467 A1* 8/2010 Park ..................... G06F 1/3234 713/320
2010/0274933 A1* 10/2010 Wang ................... G06F 3/0634 710/22
2014/0059365 A1* 2/2014 Heo ..................... G06F 1/3215 713/320
2015/0212564 A1* 7/2015 Min ...................... G06F 1/329 713/320
2015/0347328 A1* 12/2015 Dominguez ........... G06F 9/544 710/267
2015/0362980 A1* 12/2015 Tripathi ............... G06F 1/3287 713/324
2016/0124762 A1* 5/2016 Tsirkin ............... G06F 9/45558 718/1
2016/0170474 A1* 6/2016 Takemura ............ G06F 9/4893 713/324
2016/0357248 A1* 12/2016 Lingutla .............. G06F 1/3296
2019/0163251 A1* 5/2019 Gada .................... G06F 9/5027
2020/0233713 A1* 7/2020 Zhao .................... G06F 9/5083
2021/0096770 A1* 4/2021 Yamaguchi .......... G06F 3/0604
2021/0149960 A1* 5/2021 Fan .................... G06F 12/0813
2022/0011852 A1* 1/2022 Udhayan .............. G06F 1/3296
2022/0066817 A1* 3/2022 Cayssials ............... G06F 9/542
2025/0044858 A1* 2/2025 Zhao .................... G06F 1/3234

* cited by examiner 19.5
19.4
19.3
19.2
19.1
19
white noise α(t)
temperature drift β(t)

r(t)

y(n)'
y(n)
DRI
ISR => δ(t)

δ(t)
y(n)

ELECTRONIC DEVICE AND METHOD FOR INTERRUPT PROCESSING WITH LOW POWER CONSUMPTION

CROSS REFERENCE TO RELATED APPLICATIONS

This application claims priority of China Patent Application No. 202310978609.5, filed on Aug. 4, 2023, and China Patent Application No. 202410788353.6, filed on Jun. 18, 2024, the entirety of which is incorporated by reference herein.

BACKGROUND OF THE INVENTION

Field of the Invention

The present invention relates to an electronic device, and, in particular, to an electronic device and a method for interrupt and task processing with ultra-low power framework.

Description of the Related Art

An always on domain coprocessor may take over the low-power functions of a system, such as voice wake-up monitoring, location tracking, motion detection, camera, etc. As the first wake-up source, the always on coprocessor can respond to various user behaviors with extremely low power consumption. Through coprocessor processing, it is decided whether to wake up the application processor to notify the application to continue subsequent processing. In most cases, the coprocessor can handle many wake-up operations without notifying an application processor, thereby reducing power consumption.

Usually an external interrupt or a timer interrupt method is used to wake up the coprocessor from an idle state to an active state. After the coprocessor wakes up, in the interrupt service routine, it wakes up the corresponding task to perform subsequent sampling and low-power functions. However, discretely waking up the coprocessor causes the coprocessor to be woken up frequently and thus increases power consumption.

If the coprocessor determines that the application processor needs to be woken up, the application processor will also be discretely activated for subsequent operations, thereby increasing the power consumption of the application processor.

BRIEF SUMMARY OF THE INVENTION

An embodiment of the present invention provides an electronic device with an ultra-low power framework. The electronic device with the ultra-low power framework further includes a coprocessor, an application processor, a memory protect unit, a memory access monitor, a local memory, and multiple global memories. The coprocessor runs the ultra-low power framework. The ultra-low power framework includes an interrupt align and activity group, a memory predict monitor, a task dynamic migration monitor. The interrupt align and activity group is executed by the coprocessor. The interrupt align and activity group aligns multiple interrupts, so that the coprocessor is waken up based on the aligned interrupts to perform all expired low power functions, and the application processor is aligned to wake up based on a wakeup of the coprocessor. The memory predict monitor is executed by the memory protect unit and the memory access monitor. The memory predict monitor predicts a next time point when the global memories are accessed, and determines whether to power off the global memories through the memory access monitor. The task dynamic migration monitor is executed by the coprocessor. The task dynamic migration monitor selects one of the global memories or the local memory to be accessed according to a task loading and a running frequency.

According to the electronic device described above, the memory protect unit sends the interrupts to the coprocessor to power on the global memories when the coprocessor accesses the global memories for the first time. The memory access monitor is electrically connected to the memory protect unit, and sends the interrupts to the coprocessor to power off the global memories when the coprocessor does not access the global memories in the predetermined period.

The electronic device further includes an interrupt controller. The interrupt controller is electrically connected between the memory access monitor and the coprocessor, and bypasses the interrupts from the memory protect unit or the memory access monitor to the coprocessor.

According to the electronic device described above, the global memories include a dynamic random-access memory (DRAM) and a global static random access memory (SRAM).

According to the electronic device described above, the local memory includes a local static random-access memory (SRAM).

According to the electronic device described above, the interrupts includes external interrupts and timer interrupts.

According to the electronic device described above, the coprocessor aligns the timer interrupts from a tick timer by classifying the timer interrupts into multiple timer vectors based on trigger frequencies of the timer interrupts to generate a timer wheel. The timer wheel includes the timer vectors corresponding to different trigger frequencies in sequence. The coprocessor further aligns the multiple interrupts by selecting the timer vector which was the latest to expire, triggering the interrupts in said timer vector to perform a corresponding task, and triggering the interrupts in the subsequent timer vectors in the timer wheel.

According to the electronic device described above, the coprocessor classifies the external interrupts from an inertial processing unit into the timer vectors based on trigger frequencies of the timer interrupts and the external interrupts to generate the timer wheel.

According to the electronic device described above, the coprocessor aligns the multiple interrupts by calibrating the trigger frequencies of the external interrupts in the timer vectors by lowering noises.

According to the electronic device described above, the noises include a white noise, a temperature drift, other interrupts with different trigger frequencies, and an interrupt handling error from the inertial processing unit.

According to the electronic device described above, the coprocessor lowers the noise using a Local Statistic Filter or a Kalman Filter.

According to the electronic device described above, the memory access monitor includes a timeout counter. When the memory access monitor determines that there is access to the global memories through the memory protect unit, the memory access monitor resets the count value of the timeout counter.

According to the electronic device described above, when the memory access monitor determines that there is no access to the global memories through the memory protect unit, the memory access monitor reduces the count value of the timeout counter by one.

According to the electronic device described above, when the count value of the timeout counter equals zero, the memory access monitor sends the interrupts to the coprocessor to power off the global memories.

According to the electronic device described above, when the memory protect unit determines that the coprocessor has accessed the global memories for the first time, the coprocessor powers on the memory access monitor.

According to the electronic device described above, after the memory access monitor sends the interrupts to the coprocessor to power off the global memories, the coprocessor powers off the memory access monitor.

According to the electronic device described above, the memory access monitor includes a state machine. When the memory protect unit determines that the coprocessor has accessed the global memories for the first time, the coprocessor sets the state machine to an enable status, so that the memory access monitor is powered on.

According to the electronic device described above, after the memory access monitor sends the interrupts to the coprocessor to power off the global memories, the coprocessor sets the state machine to a disable status, so that the memory access monitor is powered off.

According to the electronic device described above, the memory protect unit sends the interrupts to the coprocessor to power on the global memories when the coprocessor accesses the global memories for the first time. The memory access monitor sends the interrupts to the coprocessor to power off the global memories when the coprocessor does not access the global memories in the predetermined period.

An embodiment of the present invention also provides a method for interrupt processing with low power consumption. The method is applied to an electronic device having a local memory, a plurality of global memories, a coprocessor, a memory access monitor and a memory protect monitor. The method includes the following steps. An ultra-low power framework is run by the coprocessor. The ultra-low power framework comprises an interrupt align and activity group, a memory predict monitor, and a task dynamic migration monitor. Multiple interrupts are aligned by the interrupt align and activity group, so that the coprocessor is waken up based on the aligned interrupts to perform all expired low power functions, and the application processor is aligned to wake up based on a wakeup of the coprocessor. The memory predict monitor is run to predict a next time point when the global memories are accessed by the memory access monitor and the memory protect unit, and to determine whether to power off the global memories through the memory access monitor. One of the global memories or the local memory is selected to be accessed by the task dynamic migration monitor according to the task loading and the running frequency.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1:
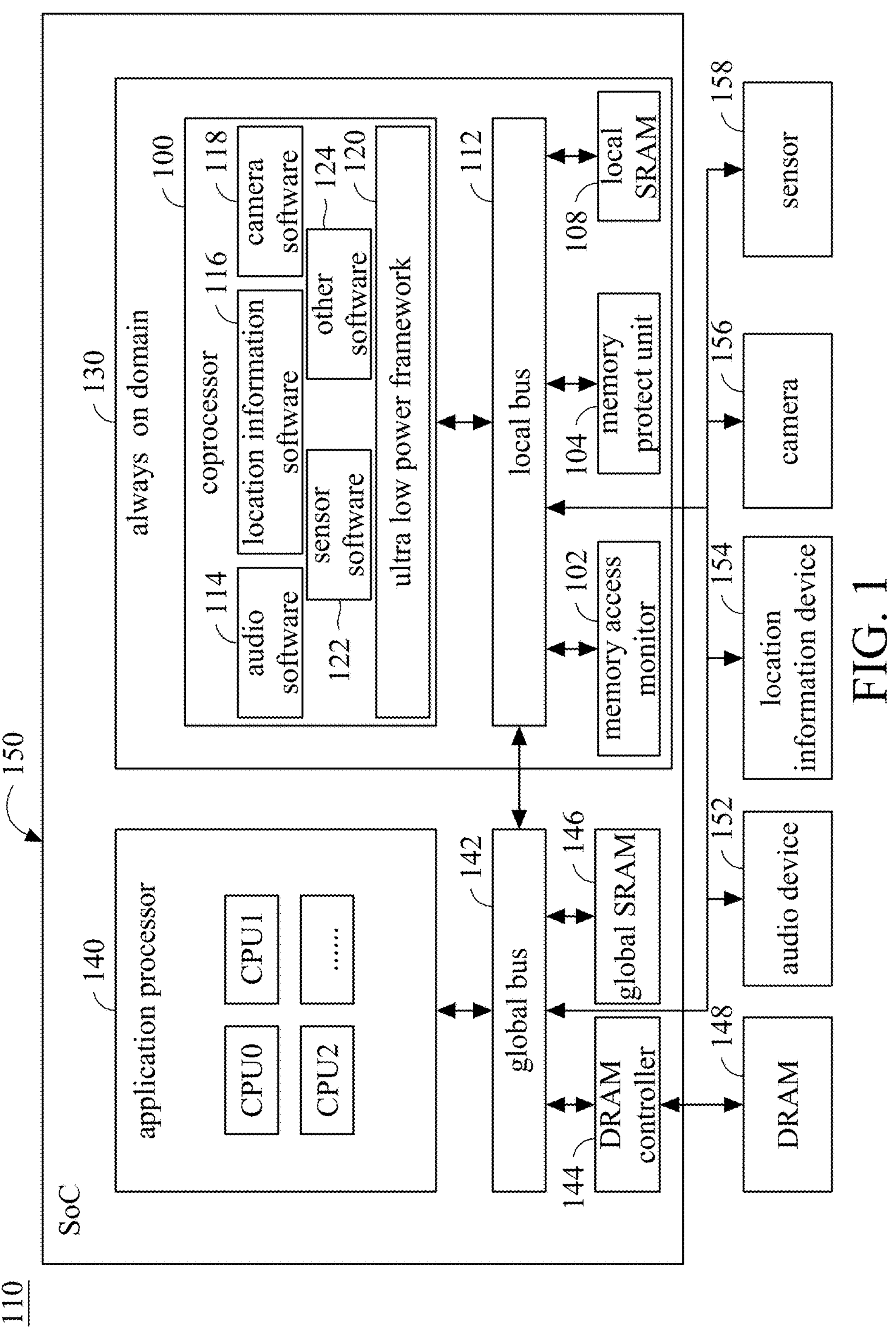
FIG. 1 shows a schematic diagram of an electronic device 110 in accordance with some embodiments of the present invention.

In order to make the above purposes, features, and advantages of some embodiments of the present invention more comprehensible, the following is a detailed description in conjunction with the accompanying drawing.

Certain terms are used throughout the description and following claims to refer to particular components. As one skilled in the art will understand, electronic equipment manufacturers may refer to a component by different names. This document does not intend to distinguish between components that differ in name but not function. It is understood that the words “comprise”, “have” and “include” are used in an open-ended fashion, and thus should be interpreted to mean “include, but not limited to . . . ”. Thus, when the terms “comprise”, “have” or “include” used in the present invention are used to indicate the existence of specific technical features, values, method steps, operations, units or components. However, it does not exclude the possibility that more technical features, numerical values, method steps, work processes, units, components, or any combination of the above can be added.

The directional terms used throughout the description and following claims, such as: "on", "up", "above", "down", "below", "front", "rear", "back", "left", "right", etc., are only directions referring to the drawings. Therefore, the directional terms are used for explaining and not used for limiting the present invention. Regarding the drawings, the drawings show the general characteristics of methods, structures, or materials used in specific embodiments. However, the drawings should not be construed as defining or limiting the scope or properties encompassed by these embodiments. For example, for clarity, the relative size, thickness, and position of each layer, each area, or each structure may be reduced or enlarged.

When the corresponding component such as layer or area is referred to as being "on another component", it may be directly on this other component, or other components may exist between them. On the other hand, when the component is referred to as being "directly on another component (or the variant thereof)", there is no component between them. Furthermore, when the corresponding component is referred to as being "on another component", the corresponding component and the other component have a disposition relationship along a top-view/vertical direction, the corresponding component may be below or above the other component, and the disposition relationship along the top-view/vertical direction is determined by the orientation of the device.

It should be understood that when a component or layer is referred to as being "connected to" another component or layer, it can be directly connected to this other component or layer, or intervening components or layers may be present. In contrast, when a component is referred to as being "directly connected to" another component or layer, there are no intervening components or layers present.

The electrical connection or coupling described in this disclosure may refer to direct connection or indirect connection. In the case of direct connection, the endpoints of the components on the two circuits are directly connected or connected to each other by a conductor line segment, while in the case of indirect connection, there are switches, diodes, capacitors, inductors, resistors, other suitable components, or a combination of the above components between the endpoints of the components on the two circuits, but the intermediate component is not limited thereto.

The words "first", "second", "third", "fourth", "fifth", and "sixth" are used to describe components. They are not used to indicate the priority order of or advance relationship, but only to distinguish components with the same name.

It should be noted that the technical features in different embodiments described in the following can be replaced, recombined, or mixed with one another to constitute another embodiment without depart in from the spirit of the present invention.

FIG. 1 shows a schematic diagram of an electronic device 110 in accordance with some embodiments of the present invention. As shown in FIG. 1, the electronic device 110 includes a system-on-chip (Soc) 150, a DRAM 148, an audio device 152, a location information device 154, a camera 156, and a sensor 158. In some embodiments, the electronic device 110 may be a tablet, a laptop, a smart phone, or a wearable device, but the present invention is not limited thereto. The SoC 150 includes an application processor 140 having multiple central processing units, for example, CPU0, CPU1, CPU2. The SoC 150 further includes a global bus 142, a DRAM controller 144, a global SRAM 146, and an always on domain 130. In some embodiments, the application processor 140 is electrically connected to the global bus 142. The global bus 142 is electrically connected to the DRAM controller 144, the global SRAM 146, the audio device 152, the location information device 154, the camera 156, and the sensor 158. The DRAM controller 144 is electrically connected to the DRAM 148.

In the always on domain 130 of the SoC 150, the electronic device 110 includes a coprocessor 100, a memory access monitor 102, a memory protect unit 104, a local SRAM 108, and a local bus 112. The coprocessor 100 is electrically connected to the local bus 112. The local bus 112 is electrically connected to the global bus 142, the memory access monitor 102, the memory protect unit 104, and the local SRAM 108. In some embodiments, the coprocessor 100 executes audio software 114 to process interrupts for the audio device 152. The coprocessor 100 executes location information software 116 to process interrupts for the location information device 154. The coprocessor 100 executes camera software 118 to process interrupts for the camera 156. The coprocessor 100 executes sensor software 122 to process interrupts for the sensor 158. The coprocessor 100 further executes other software 124 to process interrupts for other devices.

In some embodiments, the coprocessor 100 runs an ultra-low power framework 120. The ultra-low power framework 120 includes an interrupt align and activity group, a memory predict monitor, and a task dynamic migration monitor. The interrupt align and activity group aligns multiple interrupts, so that the coprocessor 100 is waken up based on the aligned interrupts to perform all expired low power functions, and the application processor 140 is aligned to wake up based on a wakeup of the coprocessor 100. The memory protect unit 104 and the memory access monitor 102 run the memory predict monitor to predict a next time point when the global SRAM 146 or the DRAM 148 are accessed, and to determine whether to power off the global SRAM 146 or the DRAM 148 through the memory access monitor 102. The task dynamic migration monitor selects one of the global SRAM 146 and the DRAM 148 or the local SRAM 108 to be accessed according to the task loading and the running frequency of a task executed by the coprocessor 100. The memory access monitor 102 is electrically coupled to the global SRAM 146 and the DRAM 148 and the coprocessor 100. The memory protect unit 104 sends the interrupts to the coprocessor 100 when the global SRAM 146 or the DRAM 148 are accessed for the first time. The memory access monitor 102 also sends the interrupts to the coprocessor 100 when the global SRAM 146 or the DRAM 148 are not accessed in a predetermined period.

In some embodiments, the coprocessor 100 aligns external interrupts and timer interrupts to avoid frequently waking up the coprocessor 100. The coprocessor 100 is able to execute all expired low-power functions at once, so the present invention can remain more idle time or sleep time for the coprocessor 100 to save power consumption, and at the same time, the present invention can also wake up the application processor 140 in an aligned manner. In some embodiments, the coprocessor 100 predicts the next usage time of the global SRAM 146 and the DRAM 148, and determines whether to power off the global SRAM 146 or the DRAM 148 according to the ultra-low power framework through the memory access monitor 102 to save power consumption. In some embodiments, the coprocessor 100 selects one of the global SRAM 146 and the DRAM 148 or the local SRAM 108 to be accessed according to the task loading and the running frequency to optimal power consumption.

Figure 2:
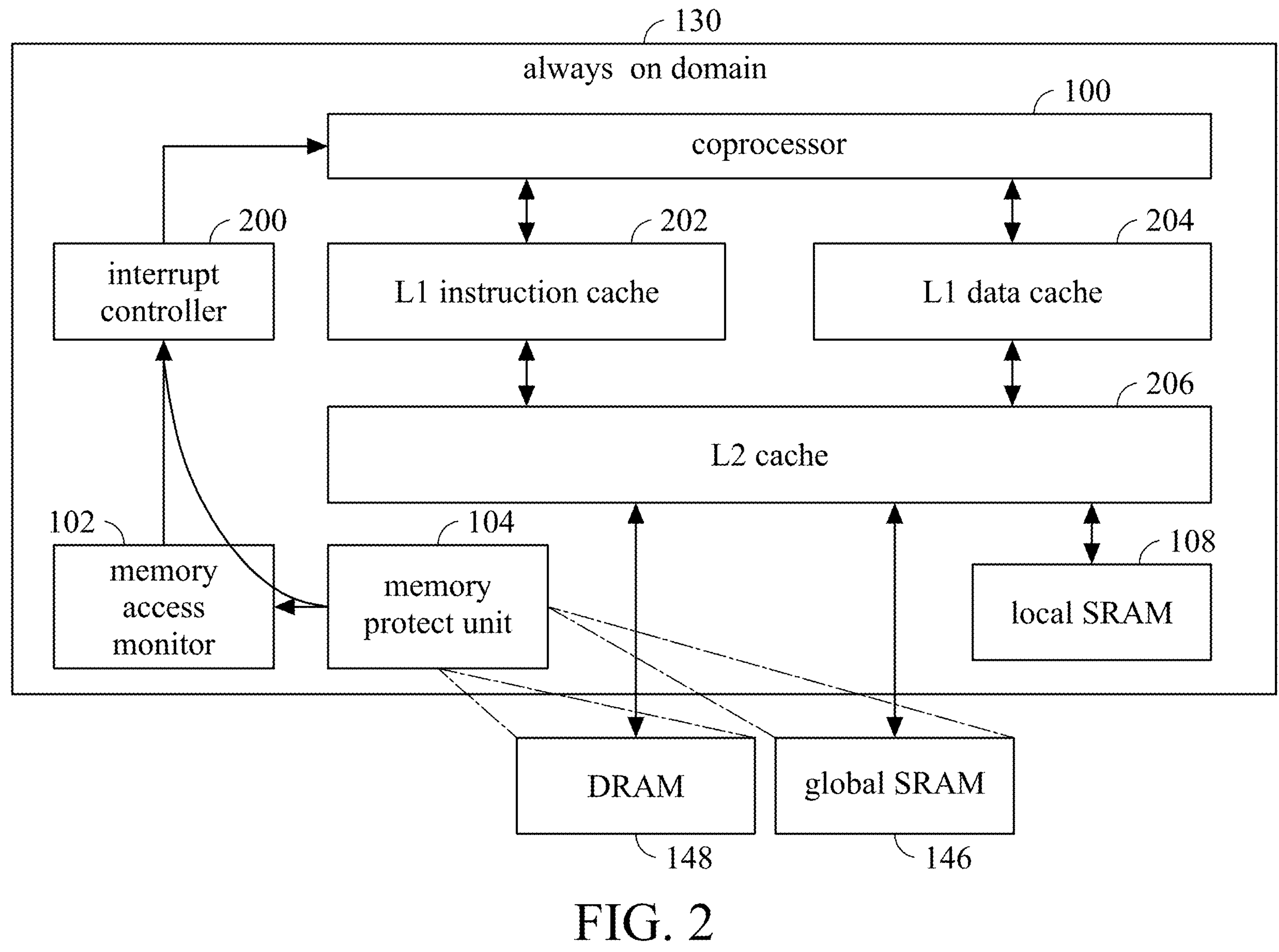
FIG. 2 shows a schematic diagram of an always on domain 130 in the electronic device 110, a global static random access memory (SRAM) 146, and a dynamic random access memory (DRAM) 148 in FIG. 1 in accordance with some embodiments of the present invention.

FIG. 2 shows a schematic diagram of an always on domain 130 in the electronic device 110, a global static random access memory (SRAM) 146, and a dynamic random access memory (DRAM) 148 in FIG. 1 in accordance with some embodiments of the present invention. As shown in FIG. 2, the always on domain 130 includes the coprocessor 100, the memory access monitor 102, the memory protect unit 104, the local SRAM 108, the global SRAM 146, the DRAM 148, an interrupt controller 200, an L1 instruction cache 202, an L1 data cache 204, and an L2 cache 206. The L1 instruction cache 202 and the L1 data cache 204 are electrically connected between the coprocessor 100 and the L2 cache 206. The L2 cache is electrically connected to the local SRAM 108, the global SRAM 146, and the DRAM 148. In some embodiments, the memory protect unit 104 sends the interrupts to the coprocessor 100 through the interrupt controller 200 to power on the global SRAM 146 or the DRAM 148 when the coprocessor 100 accesses the global SRAM 146 or the DRAM 148 for the first time. In some embodiments, the memory access monitor 102 sends the interrupts to the coprocessor 100 through the interrupt controller 200 to power off the global SRAM 146 or the DRAM 148 when the coprocessor 100 does not access the global SRAM 146 or the DRAM 148 in the predetermined period. The interrupt controller 200 is electrically connected between the memory access monitor 102 and the coprocessor 100. The interrupt controller 200 bypasses the interrupts from the memory protect unit 104 or the memory access monitor 102 to the coprocessor 100.

Figure 3:
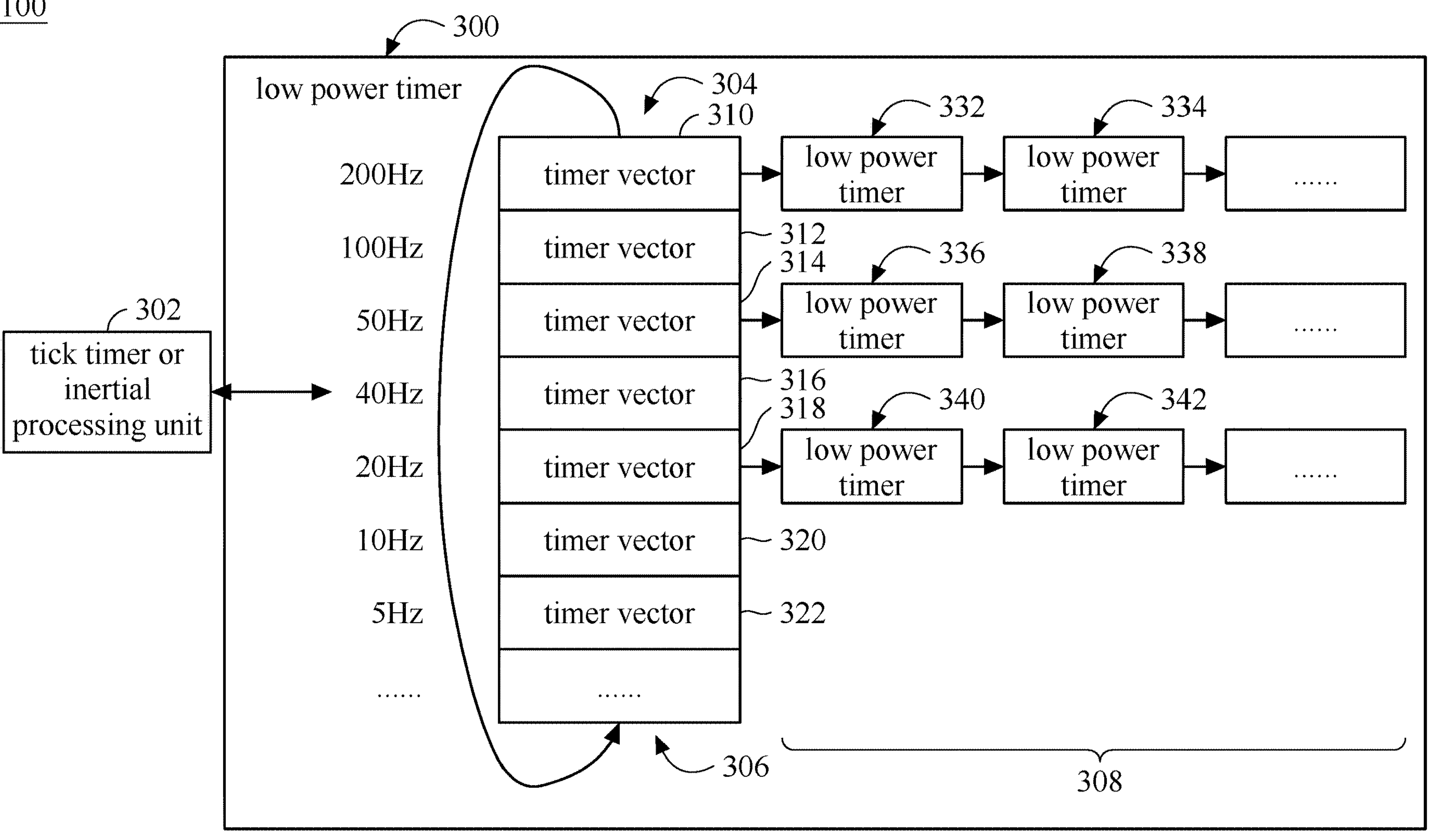
FIG. 3 shows a schematic diagram of a low power timer 300 and an inertial processing unit 302 in a coprocessor 100 in FIG. 1 in accordance with some embodiments of the present invention.

FIG. 3 shows a schematic diagram of a low power timer 300 and an inertial processing unit 302 in a coprocessor 100 in FIG. 1 in accordance with some embodiments of the present invention. The interrupts includes external interrupts and timer interrupts. In some embodiments, the audio software 114, the location information software 116, the camera software 118, and the sensor software 122 generates the timer interrupts, and the timer interrupts are received by the coprocessor 100. The inertial processing unit 302 generates the external interrupts, and the external interrupts are received by the coprocessor 100. In some embodiments, the coprocessor 100 classifies the interrupts (including the external interrupts and the timer interrupts) into multiple timer vectors based on trigger frequencies of the interrupts to generate a timer wheel 304. The timer wheel 304 includes the timer vectors corresponding to different trigger frequencies in sequence. For example, as shown in FIG. 3, a timer vector 310 may correspond to the trigger frequency of 200 Hz. A timer vector 312 may correspond to the trigger frequency of 100 Hz. A timer vector 314 may correspond to the trigger frequency of 50 Hz. A timer vector 316 may correspond to the trigger frequency of 40 Hz. A timer vector 318 may correspond to the trigger frequency of 20 Hz. A timer vector 320 may correspond to the trigger frequency of 10 Hz. A timer vector 322 may correspond to the trigger frequency of 5 Hz.

As shown in FIG. 3, the timer vector 310 may include interrupts from a low power timer 332 and interrupts from a low power timer 334. The timer vector 314 may include interrupts from a low power timer 336 and interrupts from a low power timer 338. The timer vector 318 may include interrupts from a low power timer 340 and interrupts from a low power timer 342. In some embodiments, the low power timers 332, 334, 336, 338, 340, and 342 may be configured by the audio software 114, the location information software 116, the camera software 118, and the sensor software 122. FIG. 3 also shows an index array 306 to represent the timer vectors 310, 312, 314, 316, 318, 320, and 322. FIG. 3 also shows a list array 308 to represent the low power timers 332, 334, 336, 338, 340, and 342.

Afterward, the coprocessor 100 selects one of the timer vectors 310, 312, 314, 316, 318, 320, or 322, whichever is the latest to expire. The coprocessor 100 triggers the interrupts in said timer vector 310, 312, 314, 316, 318, 320, or 322 to perform a corresponding task. The coprocessor 100 triggers the interrupts in the subsequent timer vectors in the timer wheel 304. For example, it is assumed that there are users present in the timer vector 310 and the timer vector 314. For example, at time 10 ms, the timer vectors 310 and 314 are triggered. At time 15 ms, the timer vector 310 is triggered. At time 20 ms, the timer vector 310 is triggered. At time 25 ms, the timer vector 310 is triggered. At time 30 ms, both the timer vectors 310 and 314 are triggered. A trigger source to trigger the timer wheel 304 may be a tick timer or inertial processing unit 302. It is assumed that the operating frequency of the inertial processing unit is 200 Hz, there is a user for the low power timer 332 in the timer vector 310. There is a user for the low power timer 336 in the timer vector 314. Since 200 Hz is an integer multiple of the trigger frequency of the timer vectors 310 and 314, the tick timer or inertial processing unit 302 is switched to the inertial processing unit 302 as the trigger source. For example, at time 10 ms, the inertial processing unit 302, the timer vector 310, and the timer vector 314 are triggered. At time 15 ms, the inertial processing unit and the timer vector 310 are triggered. At time 20 ms, the inertial processing unit 302 and the timer vector 310 are triggered. At time 25 ms, the inertial processing unit 302 and the timer vector 310 are triggered. At time 30 ms, the inertial processing unit 302, the timer vector 310, and the timer vector 314 are triggered. Therefore, the coprocessor 100 is waken up to execute expired low-power functions. That is, the interrupts from the audio software 114, the location information software 116, the camera software 118, the sensor software 122, and the inertial processing unit 302 are aligned.

Figure 4:
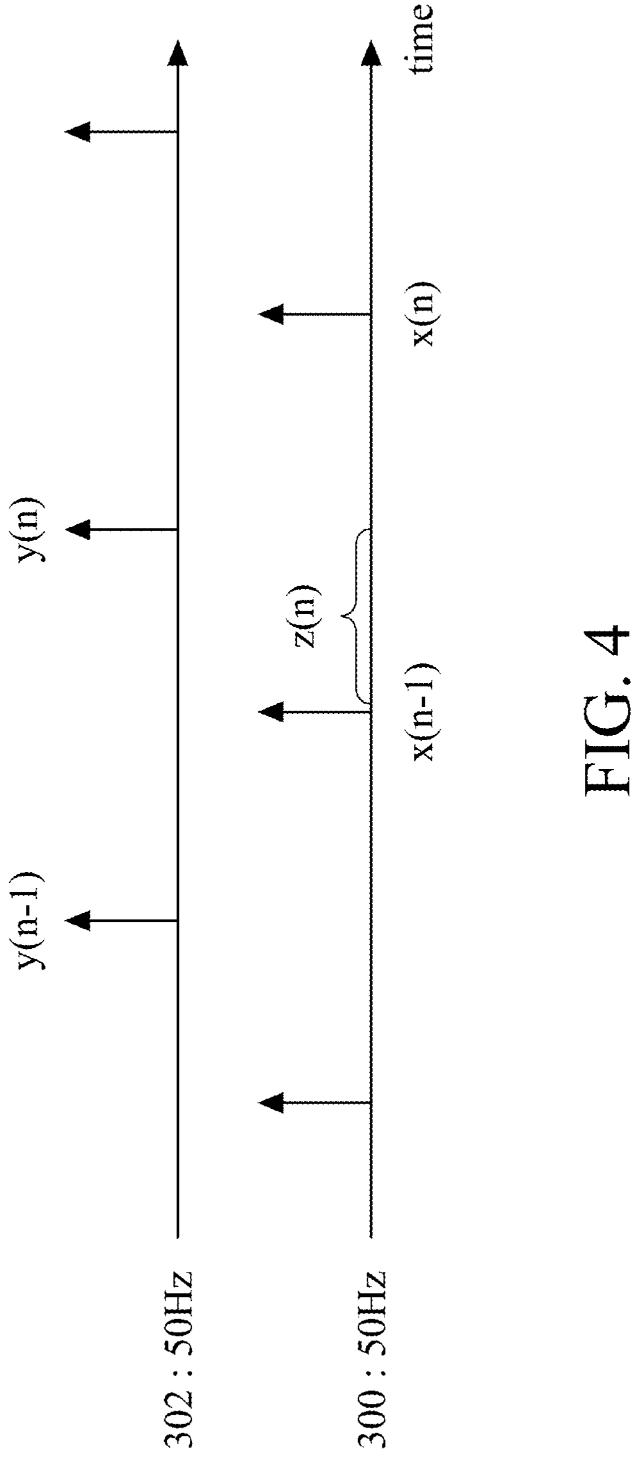
FIG. 4 shows a schematic diagram of interrupts from the low power timer 300 and the inertial processing unit 302 in accordance with some embodiments of the present invention.

FIG. 4 shows a schematic diagram of interrupts from the low power timer 300 and the inertial processing unit 302 in accordance with some embodiments of the present invention. As shown in FIG. 4, a frequency y(n) is a trigger frequency of the interrupts from the inertial processing unit 302 at current time point. A frequency y(n−1) is a trigger frequency of the interrupts from the inertial processing unit 302 at last time point. A frequency x(n) is a trigger frequency of the interrupts from the low power timer 300 at current time point. A frequency x(n−1) is a trigger frequency of the interrupts from the low power timer 300 at last time point. A frequency z(n) is an error frequency between the frequency y(n) and the frequency x(n−1). As shown in FIG. 4, the frequency x(n), the frequency x(n−1), the frequency y(n) and the frequency y(n−1) may be closed to 50 Hz. In detail, the coprocessor 100 executes the ultra-low power framework 120 to generate observer equations, state equations, and error analysis equations, and uses observer equations, state equations, and an error analysis equation to calibrate the frequency of the inertial processing unit 302.

Observer equations are shown as follows.

$$X(n)[\, x(n) \quad y(n) \quad z(n)\,]^T$$

$$E(n) = X(n) - X(n-1)$$

$$E(0) = [\, \Delta T \quad \Delta T \quad 0\,]^T$$

$$\lim_{n \to \infty} E(n) = E(0)$$

X(n) is a matrix whose matrix elements are composed of the frequency x(n), the frequency y(n), and the frequency z(n). E(n) is an error matrix obtained by a difference between the matrix X(n) and the matrix X(n−1). AT is a predetermined period defined by a user, for example, 0.02 second (50 Hz in FIG. 4).

State equations are shown as follows.

$$x(n)=x(n-1)+y(n)-y(n-1)$$
$$y(n)=y(n-1)+T(t)$$
$$z(n)=y(n)-x(n-1)$$

T(t) is a real trigger period of the interrupts from the inertial processing unit 302.

The error analysis equation is shown as follows.

$$T(t)=\Delta T+\alpha(t)+\beta(t)+\gamma(t)+\delta(t)$$

α(t) is a white noise. β(t) is a temperature drift. γ(t) is other interrupts with different trigger frequencies from the inertial processing unit 302. δ(t) is an interrupt handling error by the coprocessor 100.

Figures 5A, 5B, 5C, 5D:
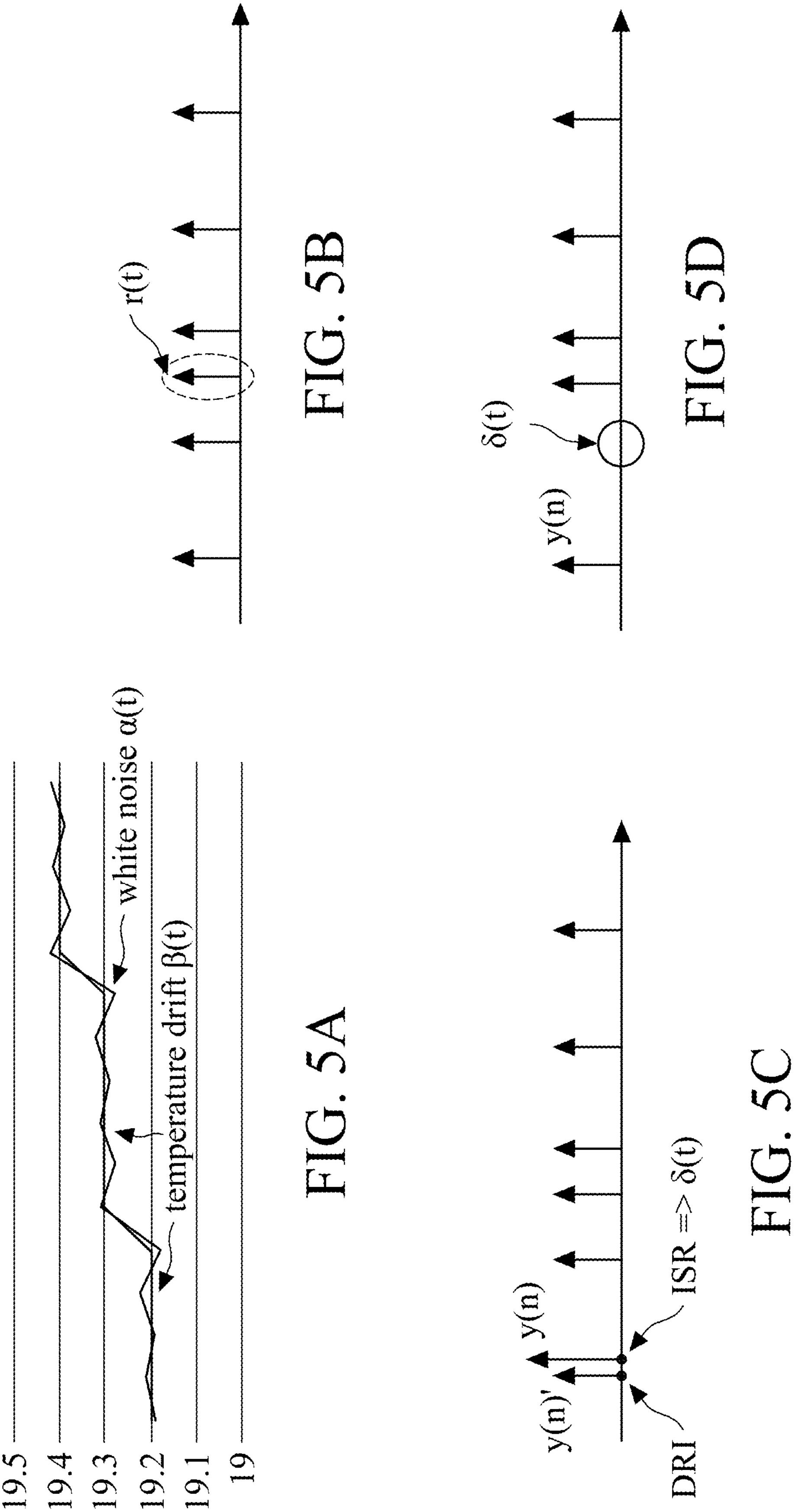
FIGS. 5A-5D show schematic diagrams of noises in the interrupts in accordance with some embodiments of the present invention.

FIGS. 5A-5D show schematic diagrams of noises in the interrupts in accordance with some embodiments of the present invention. FIG. 5A shows the white noise α(t) and the temperature drift β(t). In some embodiments, the white noise α(t) is determined by hardware structure of the inertial processing unit 302. The white noise α(t) and the temperature drift β(t) can be lowered by an algorithm. FIG. 5B shows other interrupts γ(t) with different trigger frequencies from the inertial processing unit 302. In some embodiments, other interrupts γ(t) may include data ready interrupts (DRI), but the present invention is not limited thereto. FIG. 5C shows one example of the interrupt handling error δ(t). After the coprocessor receives the data ready interrupts (DRI), the coprocessor 100 may delay processing for a period. The delay period may be equal to ISR-DRI. This one example of the interrupt handling error δ(t) can be removed through a hardware latch. FIG. 5D shows another example of the interrupt handling error (t). The coprocessor 100 shuts down long time interrupts, resulting in the loss of a certain interrupt from the inertial processing unit 302. This error can be removed through the algorithm.

In some embodiments, the coprocessor 100 lowers the noise using a Local Statistic Filter or a Kalman Filter. For example, when the coprocessor 100 cancels the noises by the Local Statistic Filter, the coprocessor 100 executes the ultra-low power framework 120 to generate state equations, bounds of absolute error equations, the local statistic filter, and a predict equation.

State equations are shown as follows.

$$y(n)=y(n-1)+\Delta T(n-1)$$
$$\Delta T(n)=y(n)-y(n-1)$$

The frequency y(n) is the trigger frequency of the interrupts from the inertial processing unit 302 at current time point. The frequency y(n−1) is the trigger frequency of the interrupts from the inertial processing unit 302 at last time point. A frequency error ΔT(n) is a frequency difference between the frequency y(n) and frequency y(n−1). Bounds of absolute error equations are shown as follows.

$$\left|\Delta T(n)-\overline{\Delta T(n-1)}\right|<\delta$$

The local statistic filter is shown as follows.

$$\overline{y(n)}=\frac{1}{M}\sum_{i=n-M-1}^{n}y(i)$$
$$\overline{\Delta T(n)}=\overline{y(n)}-\overline{y(n-1)}$$

The predict equation is shown as follows.

$$x(n)=x(n-1)+\overline{\Delta T(n)}$$

In some embodiments, the coprocessor 100 calculates an average frequency error $\overline{\Delta T(n)}$ between an average trigger frequency $\overline{y(n)}$ and an average trigger frequency $\overline{y(n-1)}$ through the bounds of absolute error equations and the local statistic filter. The coprocessor 100 cancels the other interrupts γ(t) and the interrupt handling error δ(t) through the bounds of absolute error equations, and cancels the white noise α(t) and the temperature drift β(t) through the local statistic filter. After obtaining the average frequency error $\overline{\Delta T(n)}$, the coprocessor 100 predicts the trigger frequency x(n) of the interrupts from the low power timer 300 at next time point to power on the local SRAM 146 or the DRAM 148 according to the interrupts.

When the coprocessor 100 lowers the noises by the Kalman Filter, the coprocessor 100 executes the ultra-low power framework 120 to generate state equations, the Kalman filter, and a predict equation.

State equations are shown as follows.

$$y(n)=y(n-1)+\Delta T(n-1)+Q_{\gamma}$$
$$\Delta T(n)=\Delta T(n-1)+Q_{\Delta T}$$
$$z(n)=y(n)+R$$
$$X_n=FX_{n-1}+Q,\left(X_n=\begin{bmatrix}y\\\Delta T\end{bmatrix}_n,F=\begin{bmatrix}1&1\\0&1\end{bmatrix}\right)$$
$$Z_n=HX_n+R,\ (Z_n=[z]_n,\ H=[1\ \ 0])$$

The Kalman filter is showed as follows.

$$\hat{\overline{X}}_n=F\hat{X}_{n-1}$$
$$\overline{P}_n=FP_{n-1}F^T+Q$$
$$K_n=\frac{\overline{P}_nH^T}{H\overline{P}_nH^T+R}$$
$$\hat{X}_n=\hat{\overline{X}}_n+K_n\left(Z_n-H\hat{\overline{X}}_n\right)$$
$$P_n=(1-K_nH)\overline{P}_n$$

The predict equation is shown as follows.

$$x(n) = x(n-1) + \Delta T(n)$$

The coprocessor 100 modifies the matrix Q and the matrix R to calculate an average frequency error ΔT(n). After obtaining the average frequency error ΔT(n), the coprocessor 100 predicts the trigger frequency x(n) of the interrupts from the low power timer 300 at next time point to power on the local SRAM 146 or the DRAM 148 according to the interrupts.

Figure 6A:
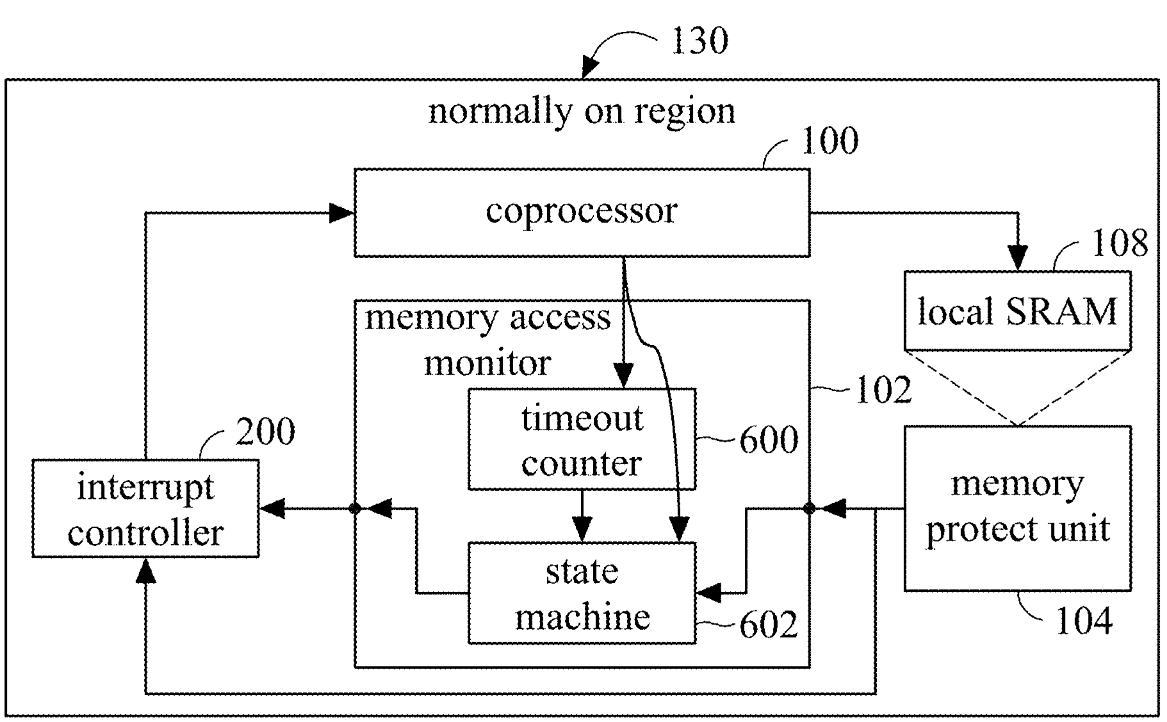
FIG. 6A shows a schematic diagram of a memory access monitor 102 in FIG. 1 in accordance with some embodiments of the present invention.
Figure 6B:
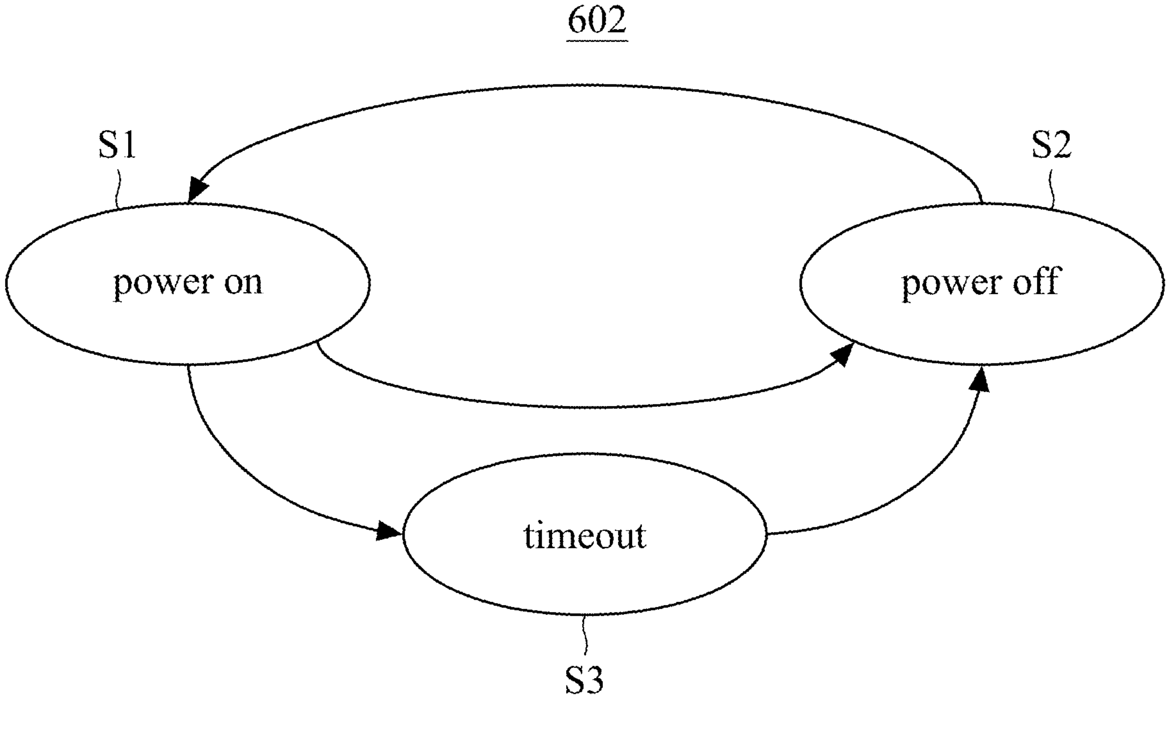
FIG. 6B shows a schematic diagram of a state machine 602 in FIG. 6A in accordance with some embodiments of the present invention.

FIG. 6A shows a schematic diagram of a memory access monitor 102 in FIG. 1 in accordance with some embodiments of the present invention. FIG. 6B shows a schematic diagram of a state machine 602 in FIG. 6A in accordance with some embodiments of the present invention. As shown in FIGS. 6A and 6B, the memory access monitor 102 includes a timeout counter 600 and a state machine 602. When the memory protect unit 104 determines that the coprocessor 100 has accessed the global SRAM 146 or the DRAM 148 for the first time, the coprocessor 100 sets the state machine 602 to an enable status (step S1), so that the memory access monitor 102 is powered on. When the memory access monitor 102 determines that there is no access to the global SRAM 146 or the DRAM 148 through the memory protect unit 104, the memory access monitor 102 reduces the count value of the timeout counter 600 by one. When the count value of the timeout counter 600 equals zero (step S3), the state machine 602 receives a timeout message from the timeout counter, so that the memory access monitor 102 sends the interrupts to the coprocessor 100 to power off the global SRAM 146 or the DRAM 148. In some embodiments, after the memory access monitor 102 sends the interrupts to the coprocessor 100 to power off the global SRAM 146 or the DRAM 148, the coprocessor 100 sets the state machine 602 to a disable status (step S2), so that the memory access monitor 102 is powered off.

Figure 7:
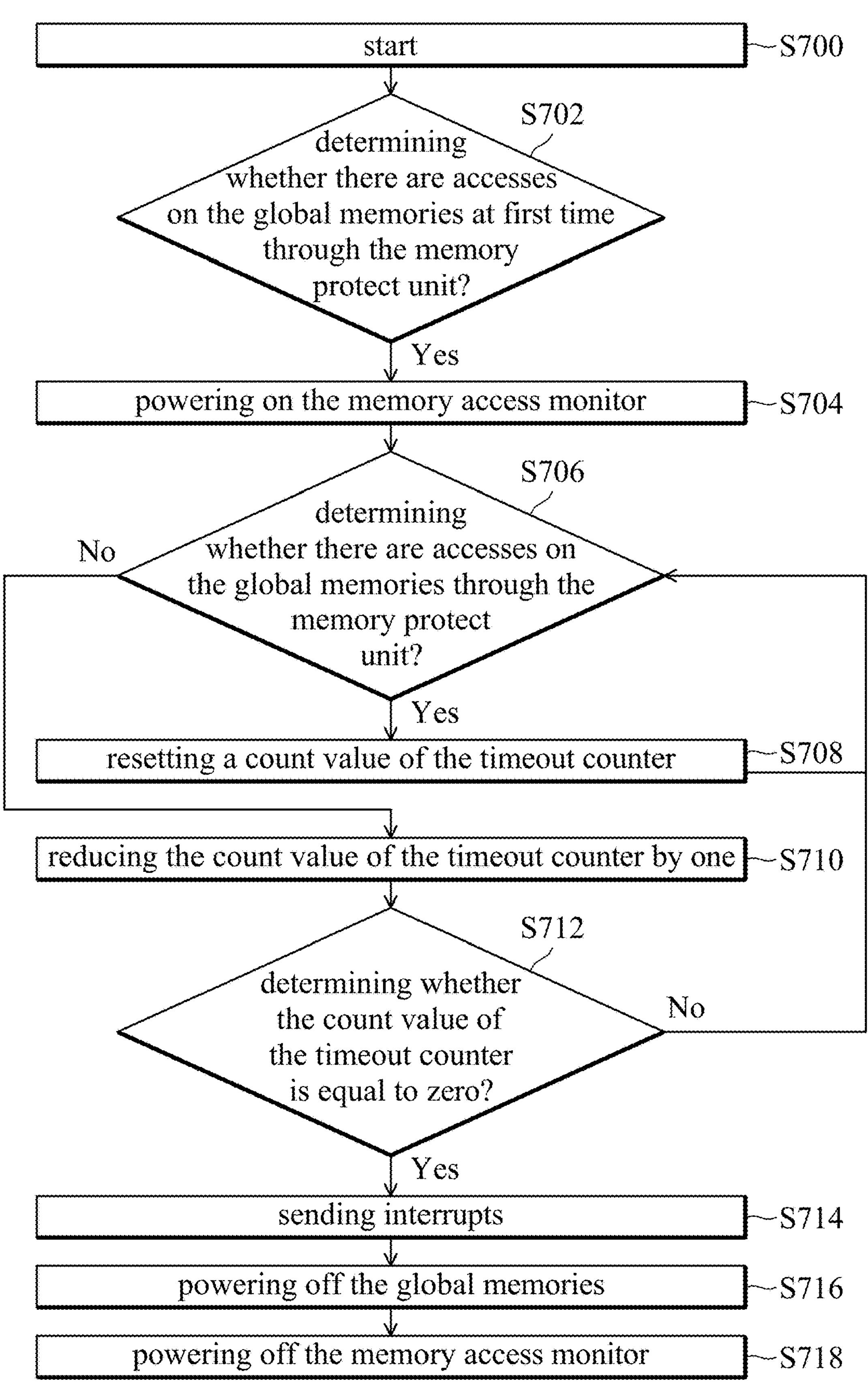
FIG. 7 shows a flow chart of operations of determining whether to power off a global SRAM 146 or a DRAM 148 according to the interrupts by the coprocessor 100 in FIG. 1 in accordance with some embodiments of the present invention.

FIG. 7 shows a flow chart of operations of determining whether to power off a global SRAM 146 or a DRAM 148 according to the interrupts by the coprocessor 100 in FIG. 1 in accordance with some embodiments of the present invention. As shown in FIG. 7, the coprocessor starts actions (step S700). In step S702, the coprocessor 100 determines that the global SRAM 146 or the DRAM 148 is accessed for the first time through the memory protect unit 104, the coprocessor 100 powers on the memory access monitor 102 in step S704. In step S706, the coprocessor 100 determines whether the global SRAM 146 or the DRAM 148 is accessed through the memory protect unit 104. If the answer is yes in step S708, the memory access monitor 102 resets the timeout counter 600, and the coprocessor 100 executes step S706 again. If the answer is no in step S708, the memory access monitor 102 reduces the count value of the timeout counter 600 by one in step S710. In step S712, the memory access monitor 102 determines whether the count value of the timeout counter 600 equals zero.

If the answer is no in step S712, the coprocessor 100 executes step S706 again. If the answer is yes in step S712, the memory access monitor 102 sends the interrupts to the coprocessor 100 in step S714. After receiving the interrupts from the memory access monitor 102, the coprocessor 100 powers off the global SRAM 146 or the DRAM 148 in step S716. After the memory access monitor 102 sends the interrupts to the coprocessor 100 to power off the global SRAM 146 or the DRAM 148, the coprocessor 100 sets the state machine 602 to the disable status, so that the memory access monitor 102 is powered off in step S718.

Figure 8:
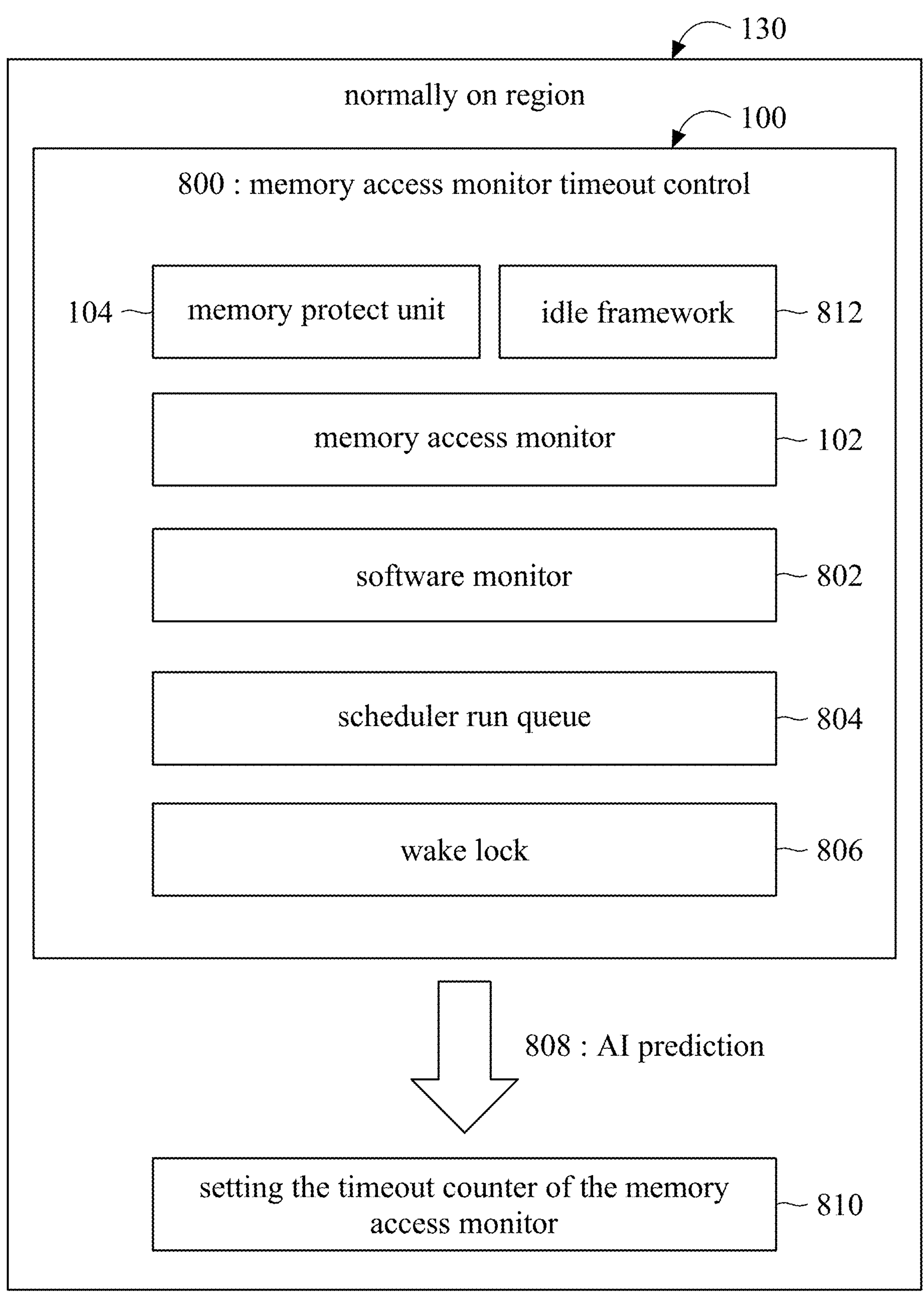
FIG. 8 shows a schematic diagram of operations of predicting the next time point to power on the global SRAM 146 or the DRAM 148 according to the interrupts by the coprocessor 100 in FIG. 1 in accordance with some embodiments of the present invention.

FIG. 8 shows a schematic diagram of operations of predicting the next time point to power on the global SRAM 146 or the DRAM 148 according to the interrupts by the coprocessor 100 in FIG. 1 in accordance with some embodiments of the present invention. As shown in FIG. 8, the coprocessor 100 executes a memory access monitor timeout control 800 to predict the next time point. In some embodiments, the coprocessor 100 predicts the next time point to power on the global SRAM 146 or the DRAM 148. Because it takes some time to power on the 148 DRAM and the global SRAM 146, in order to achieve better performance, the coprocessor 100 executes an idle framework 812 and a scheduler run queue 804 to predict when the next task to be run will start. A timer is used to wake up the coprocessor 100 to power on the DRAM 148 or the global SRAM 146.

In some embodiments, the coprocessor 100 predicts the next time point to power off the global SRAM 146 or the DRAM 148. In order to achieve better power consumption, the count value of the timeout counter 600 should is dynamically changed to accurately control the power-off of the DRAM 148 and the global SRAM in different scenarios. The coprocessor 100 integrates power consumption-related modules in the system (such as the idle framework 812, a software monitor 802, a scheduler run queue 804, a wake lock 806, etc.), and uses an artificial intelligence (AI) prediction 808 to predict what the next timeout should be. In some embodiments, since some application programming interfaces (APIs) provided by the system are frequently used, they are arranged to put into the local SRAM 108 or the global SRAM 146. For example, if a DRAM task loop calls these APIs, the timeout counter 600 in the memory access monitor 102 does not timeout to power off the DRAM 148 or the global SRAM 146.

In some embodiments, the count value of the timeout counter 600 in the memory access monitor 102 is corrected by combining the load of the DRAM or global SRAM tasks and the load of the entire coprocessor 100. If the load of the DRAM or global SRAM tasks is very high, the count value of the timeout counter 600 can be set to a large value, or the memory access monitor 102 can be turned off directly. In some embodiments, in order to achieve better performance, some high-frequency SRAM tasks will hold the wake lock 806 to prevent the coprocessor 100 from executing the idle framework 812, which will also affect the count value of the timeout counter 600.

Figure 9:
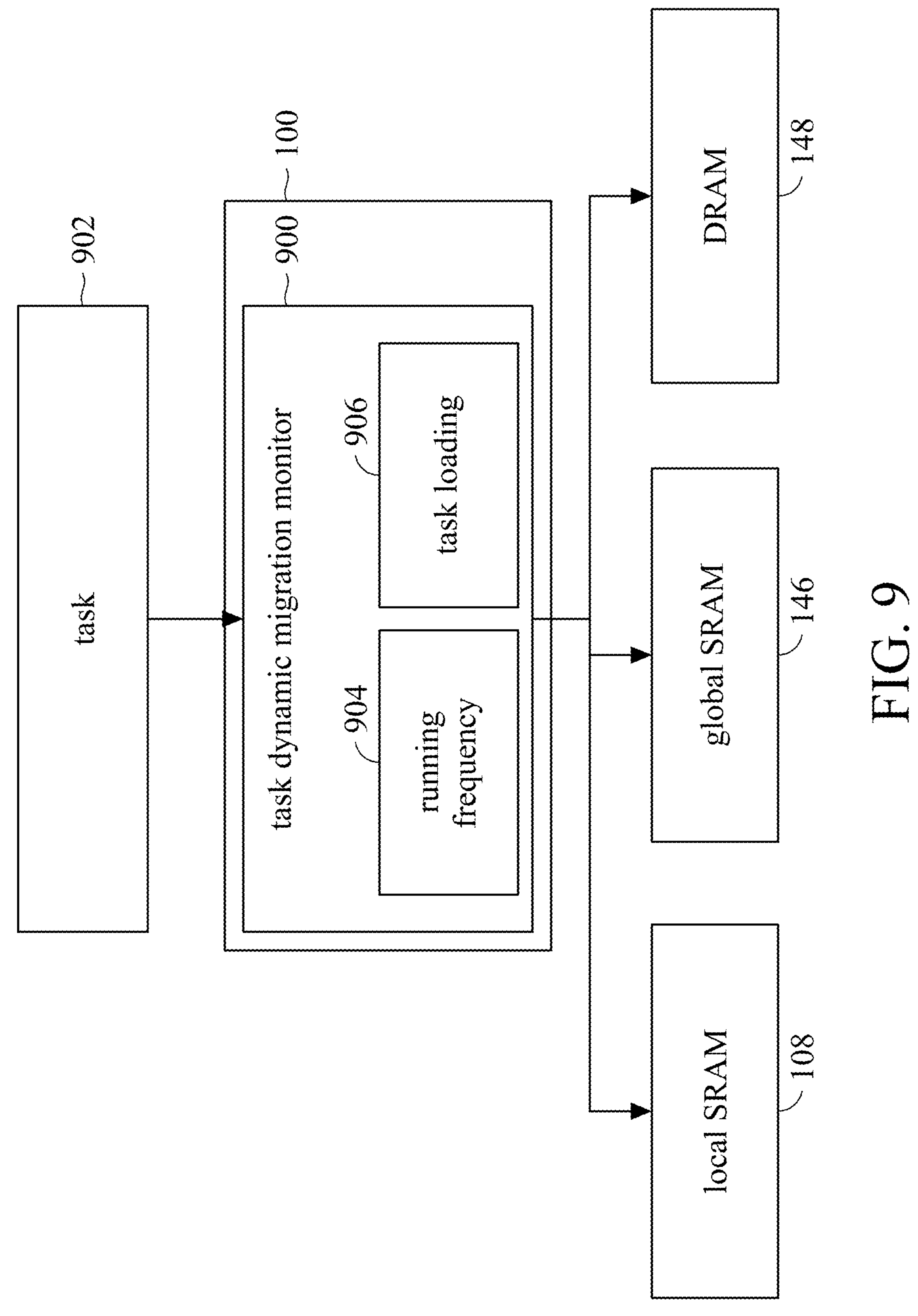
FIG. 9 shows a schematic diagram of operations of selecting a local SRAM 108 or the global SRAM 146 or the DRAM 148 to be accessed according to the task loading and the running frequency in accordance with some embodiments of the present invention.

FIG. 9 shows a schematic diagram of operations of selecting a local SRAM 108 or the global SRAM 146 or the DRAM 148 to be accessed according to the task loading and the running frequency in accordance with some embodiments of the present invention. As shown in FIG. 9, the coprocessor 100 includes a task dynamic migration monitor 900. The task dynamic migration monitor 900 first receives multiple tasks 902. The task dynamic migration monitor 900 selects a local SRAM 108, the global SRAM 146 or the DRAM 148 to be accessed according to the task loading 904 and the running frequency 906. In some embodiments, if the running frequency for the task is high (for example, higher than 200 Hz), the task dynamic migration monitor 900 selects the local SRAM 108 to be accessed for better power consumption. If the running frequency for the task is low (for example, lower than 5 Hz), the task dynamic migration monitor 900 selects the DRAM 148 to be accessed because the running frequency is low, the DRAM 148 is occupied for a short time, and the average power consumption is not very high.

If the running frequency for the task is between 5 Hz to 200 Hz, the task dynamic migration monitor 900 selects the global SRAM 146 to be accessed. In some embodiments, if a low-frequency task is selected to execute in the DRAM 148, but because the load of this task is very high, it is not suitable to continue executing in the DRAM 148. For better power consumption, the task dynamic migration monitor 900 selects this task to execute in the local SRAM 108.

Figure 10:
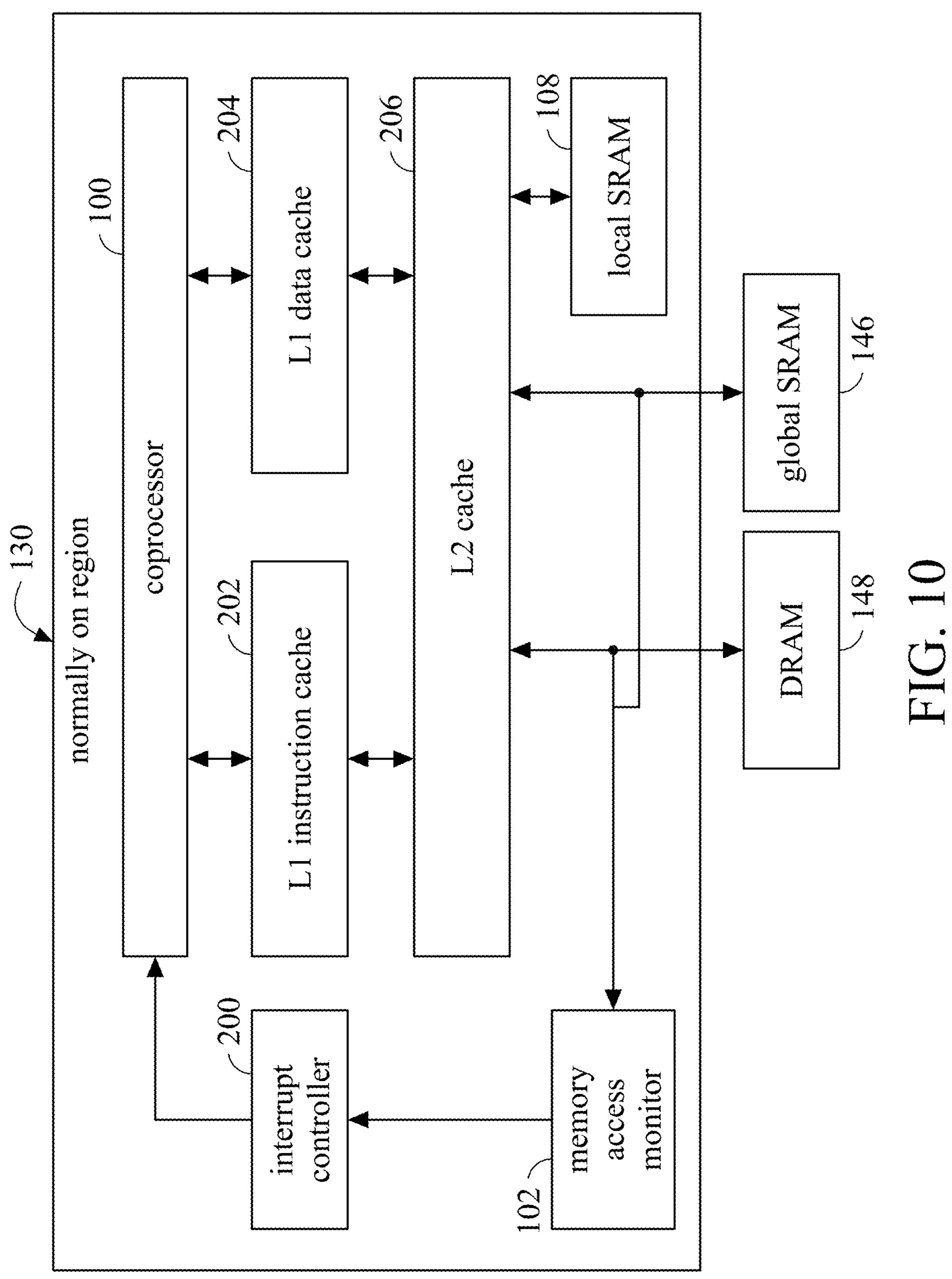
FIG. 10 shows a schematic diagram of the always on domain 130 in the electronic device 110, the SRAM 146, and the DRAM 148 in FIG. 1 in accordance with some embodiments of the present invention.

FIG. 10 shows a schematic diagram of the always on domain 130 in the electronic device 110, the SRAM 146, and the DRAM 148 in FIG. 1 in accordance with some embodiments of the present invention. Please refer to FIG. 2 and FIG. 10 at the same time. The main difference between FIG. 2 and FIG. 10 is that, there is no memory protect unit 104 in FIG. 10, so that the memory access monitor 102 is electrically connected to the DRAM 148 and the global SRAM 146 directly.

Figure 11:
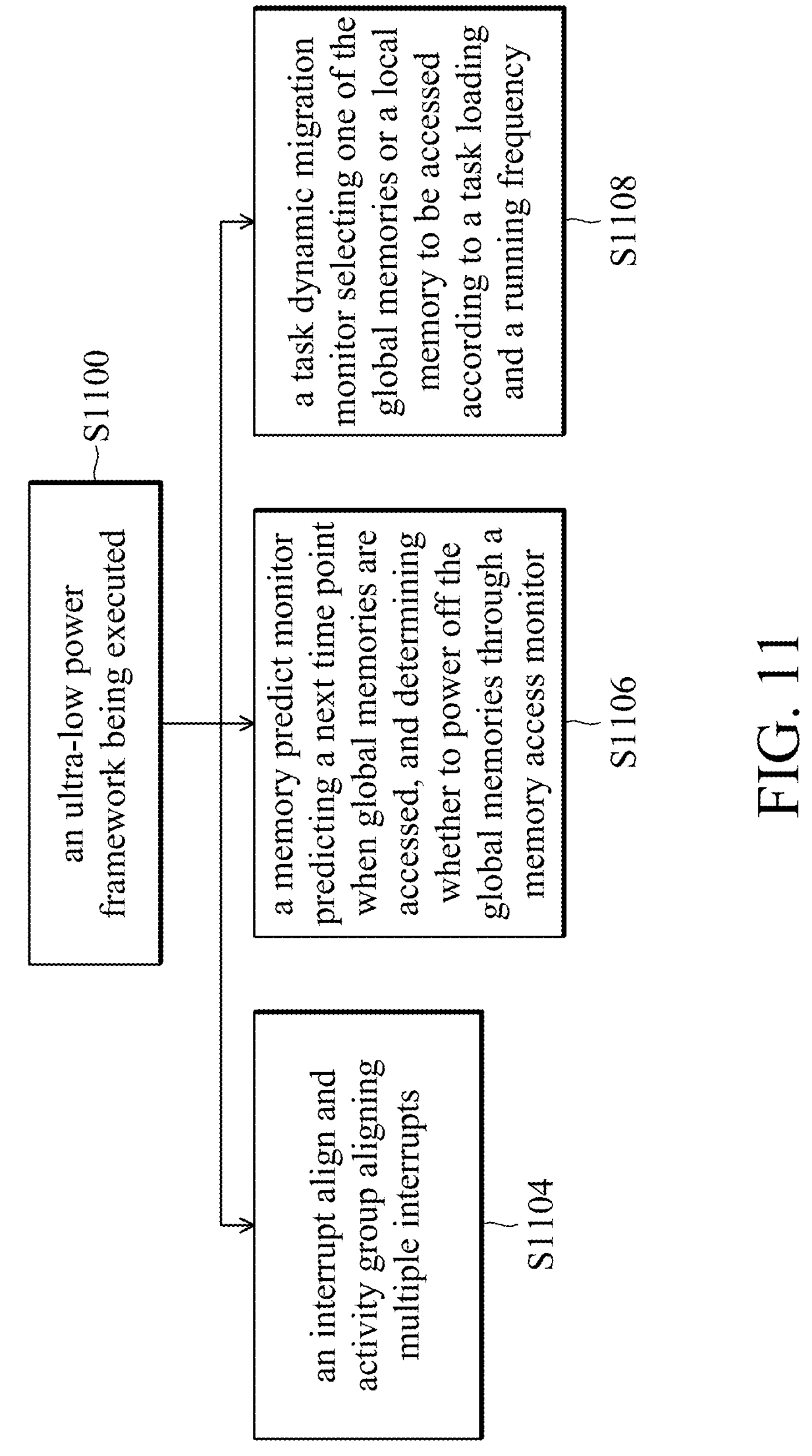
FIG. 11 shows a flow chart of a method for interrupt processing with low power consumption in accordance with some embodiments of the present invention.

FIG. 11 shows a flow chart of a method for interrupt processing with low power consumption in accordance with some embodiments of the present invention. The method for interrupt processing with low power consumption of the present invention is applied to the electronic device 110 having the local SRAM 108, the global SRAM 146, the DRAM 148, the coprocessor 100, the memory access monitor 102, and the memory protect unit 104 in FIG. 1. The method includes the following steps. An ultra-low power framework is executed (step S1100). The ultra-low power framework includes an interrupt align and activity group, a memory predict monitor, and a task dynamic migration monitor. The interrupt align and activity group aligns multiple interrupts (step S1104). The memory predict monitor predicts a next time point when the global SRAM 146 and the DRAM 148 are accessed, and determines whether to power off the global SRAM 146 and the DRAM 148 through the memory access monitor 102 (step S1106). The task dynamic migration monitor selects one of the global memories (for example, the global SRAM 146 or the DRAM 148) or the local memory (for example, the local SRAM 108) to be accessed according to the task loading and the running frequency of a task executed by the coprocessor 100 (step S1108).

The step of aligning the interrupts includes the following steps. The interrupts are classified into multiple timer vectors based on the trigger frequencies of the interrupts to generate a timer wheel. The timer wheel includes the timer vectors corresponding to different trigger frequencies in sequence. The timer vector that expired latest is selected. The interrupts in said timer vector are triggered to perform a corresponding task. The interrupts in the subsequent timer vectors in the timer wheel are triggered. In some embodiments, the trigger frequencies of the interrupts in the timer vectors are calibrated by cancelling noises.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An electronic device with an ultra-low power framework, comprising:

a local memory;

a plurality of global memories;

an application processor;

a coprocessor, electrically coupled to the local memory, the global memories, and the application processor, configured to run the ultra-low power framework; wherein the ultra-low power framework comprises an interrupt align and activity group, a memory predict monitor, and a task dynamic migration monitor; wherein the interrupt align and activity group aligns multiple interrupts, so that the coprocessor is waken up based on the aligned interrupts to perform all expired low power functions, and the application processor is aligned to wake up based on a wakeup of the coprocessor; and a memory protect unit and a memory access monitor, electrically coupled to the global memories and the coprocessor, configured to run the memory predict monitor to predict a next time point when the global memories are accessed, and to determine whether to power off the global memories through the memory access monitor;

wherein the task dynamic migration monitor selects one of the global memories or the local memory to be accessed according to a task loading and a running frequency.

2. The electronic device as claimed in claim 1, wherein the memory protect unit sends the interrupts to the coprocessor to power on the global memories when the coprocessor accesses the global memories for the first time, and the memory access monitor is electrically connected to the memory protect unit and sends the interrupts to the coprocessor to power off the global memories when the coprocessor does not access the global memories in a predetermined period.

3. The electronic device as claimed in claim 2, further comprising:

an interrupt controller, electrically connected between the memory access monitor and the coprocessor, configured to bypass the interrupts from the memory protect unit or the memory access monitor to the coprocessor.

4. The electronic device as claimed in claim 1, wherein the global memories comprise a dynamic random-access memory (DRAM) and a global static random access memory (SRAM).

5. The electronic device as claimed in claim 1, wherein the local memory comprises a local static random-access memory (SRAM).

6. The electronic device as claimed in claim 1, wherein the interrupts comprise external interrupts and timer interrupts.

7. The electronic device as claimed in claim 6, wherein the coprocessor aligns the multiple interrupts by:

classifying the timer interrupts from a tick timer into multiple timer vectors based on trigger frequencies of the timer interrupts to generate a timer wheel; wherein the timer wheel comprises the timer vectors corresponding to different trigger frequencies in sequence;

selecting the timer vector which expired latest;

triggering the interrupts in said timer vector to perform a corresponding task; and triggering the interrupts in the subsequent timer vectors in the timer wheel.

8. The electronic device as claimed in claim 7, wherein the coprocessor aligns the multiple interrupts by:

classifying the external interrupts from an inertial processing unit into the timer vectors based on trigger frequencies of the timer interrupts and the external interrupts to generate the timer wheel.

9. The electronic device as claimed in claim 8, wherein the coprocessor aligns the multiple interrupts by:

calibrating the trigger frequencies of the external interrupts in the timer vectors by lowering noises.

10. The electronic device as claimed in claim 9, wherein the noises comprise a white noise, a temperature drift, other interrupts with different trigger frequencies, or an interrupt handling error from the inertial processing unit.

11. The electronic device as claimed in claim 10, wherein the coprocessor lowers the noises using a Local Statistic Filter or a Kalman Filter.

12. The electronic device as claimed in claim 2, wherein the memory access monitor comprises a timeout counter; and when the memory access monitor determines that there is access to the global memories through the memory protect unit, the memory access monitor resets a count value of the timeout counter.

13. The electronic device as claimed in claim 12, wherein when the memory access monitor determines that there is no access to the global memories through the memory protect unit, the memory access monitor reduces the count value of the timeout counter by one.

14. The electronic device as claimed in claim 13, wherein when the count value of the timeout counter equals zero, the memory access monitor sends the interrupts to the coprocessor to power off the global memories.

15. The electronic device as claimed in claim 2, wherein when the memory protect unit determines that the coprocessor has accessed the global memories for the first time, the coprocessor powers on the memory access monitor.

16. The electronic device as claimed in claim 15, wherein after the memory access monitor sends the interrupts to the coprocessor to power off the global memories, the coprocessor powers off the memory access monitor.

17. The electronic device as claimed in claim 16, wherein the memory access monitor comprises a state machine; and when the memory protect unit determines that the coprocessor has accessed the global memories for the first time, the coprocessor sets the state machine to an enable status, so that the memory access monitor is powered on.

18. The electronic device as claimed in claim 17, wherein after the memory access monitor sends the interrupts to the coprocessor to power off the global memories, the coprocessor sets the state machine to a disable status, so that the memory access monitor is powered off.

19. The electronic device as claimed in claim 1, wherein the memory protect unit sends the interrupts to the coprocessor to power on the global memories when the coprocessor accesses the global memories for the first time, and the memory access monitor sends the interrupts to the coprocessor to power off the global memories when the coprocessor does not access the global memories in a predetermined period.

20. A method for interrupt processing with low power consumption, applied to an electronic device having a local memory, a plurality of global memories, a coprocessor, a memory access monitor, and a memory protect unit, comprising:

running an ultra-low power framework by the coprocessor; wherein the ultra-low power framework comprises an interrupt align and activity group, a memory predict monitor, and a task dynamic migration monitor;

aligning multiple interrupts by the interrupt align and activity group, so that the coprocessor is waken up based on the aligned interrupts to perform all expired low power functions, and the application processor is aligned to wake up based on a wakeup of the coprocessor;

running the memory predict monitor to predict a next time point when the global memories are accessed by the memory access monitor and the memory protect unit, and to determine whether to power off the global memories through the memory access monitor; and selecting one of the global memories or the local memory to be accessed by the task dynamic migration monitor according to a task loading and a running frequency.

* * * * *